US011305882B2

(12) United States Patent
Pautis et al.

(10) Patent No.: US 11,305,882 B2
(45) Date of Patent: Apr. 19, 2022

(54) ASSEMBLY FOR AIRCRAFT COMPRISING A PRIMARY STRUCTURE OF AN ATTACHMENT PYLON ATTACHED TO A WING BOX USING A BOLTED CONNECTION (71) Applicant: Airbus Operations S.A.S., Toulouse (FR)

(72) Inventors: Olivier Pautis, Merville (FR); Laurent Lafont, Pechbusque (FR); Rohan Nanda, Toulouse (FR)

(73) Assignee: Airbus Operations S.A.S.

( * ) Notice: Subject to any disclaimer, the term of this patent is extended or adjusted under 35 U.S.C. 154(b) by 225 days.

(21) Appl. No.: 16/603,988

(22) PCT Filed: Apr. 9, 2018

(86) PCT No.: PCT/EP2018/058960
§ 371 (c)(1),
(2) Date: Oct. 9, 2019

(87) PCT Pub. No.: WO2018/192787
PCT Pub. Date: Oct. 25, 2018

(65) Prior Publication Data
US 2020/0148378 A1 May 14, 2020

(30) Foreign Application Priority Data

Apr. 19, 2017 (FR) ...................................... 1753403

(51) Int. Cl.
*B64D 27/26* (2006.01)
*B64C 3/32* (2006.01)
*B64C 3/18* (2006.01)

(52) U.S. Cl.
CPC ................ *B64D 27/26* (2013.01); *B64C 3/32* (2013.01); *B64C 3/185* (2013.01); *B64D 2027/264* (2013.01)

(58) Field of Classification Search
CPC ........... B64C 3/32; B64C 3/185; B64D 27/26; B64D 2027/264
See application file for complete search history.

(56) References Cited

U.S. PATENT DOCUMENTS

| 10,266,273 | B2 * | 4/2019 | Kang ..................... B64D 27/26 |
| 2010/0193627 | A1 * | 8/2010 | Lafont ................... B64D 27/26 |
| | | | 244/54 |

(Continued)

FOREIGN PATENT DOCUMENTS

| EP | 1535837 A1 | 6/2005 |
| FR | 2887522 A1 | 12/2006 |

(Continued)

OTHER PUBLICATIONS

International Search Report from PCT/EP2018/058960 dated Jun. 25, 2018.

*Primary Examiner* — Richard R. Green
*Assistant Examiner* — Ashesh Dangol
(74) *Attorney, Agent, or Firm* — Lerner, David, Littenberg, Krumholz & Mentlik, LLP (57) ABSTRACT In order to bring the primary structure of an engine mounting pylon of an aircraft as close as possible to a wing box: an aircraft wing includes a wing box made partly by a front spar and an intermediate spar; a mounting pylon including a primary structure in the form of a box having transverse reinforcement ribs; and attachment means for attaching the primary structure of the mounting pylon on the wing box. These attachment means include a row of bolts along which each bolt passes through a structural part of the pylon on one (Continued)

hand, and on the other hand a fitting attached to one of the front and intermediate spars.

20 Claims, 11 Drawing Sheets

(56) References Cited

U.S. PATENT DOCUMENTS

| | | | |
|---|---|---|---|
| 2011/0127371 A1 | 6/2011 | Takeuchi | |
| 2012/0286125 A1* | 11/2012 | Marche | B64D 27/26 248/554 |
| 2013/0316128 A1* | 11/2013 | Waku | H05K 1/0366 428/114 |
| 2015/0013142 A1* | 1/2015 | West | B64D 27/26 29/525.08 |

FOREIGN PATENT DOCUMENTS

| | | |
|---|---|---|
| WO | 2007012667 A1 | 2/2007 |
| WO | 2011012822 A2 | 2/2011 |

* cited by examiner

ASSEMBLY FOR AIRCRAFT COMPRISING A PRIMARY STRUCTURE OF AN ATTACHMENT PYLON ATTACHED TO A WING BOX USING A BOLTED CONNECTION

CROSS-REFERENCE TO RELATED APPLICATIONS

The present application is a national phase entry under 35 U.S.C. § 371 of International Application No. PCT/EP2018/058960 filed Apr. 9, 2018, published in French, which claims priority from French Patent Application No. 1753403 filed Apr. 19, 2017, all of which are incorporated herein by reference.

TECHNICAL FIELD

The present invention relates to the field of aircraft, and in particular to assemblies comprising an aircraft wing and an engine mounting pylon attached beneath this wing. The invention preferably relates to such assemblies designed to support large-diameter turbofan engines. One example of this type of assembly is disclosed for example in document FR 2 887 522. The invention relates in particular to commercial airplanes.

PRIOR ART

In existing aircraft, the engines such as jet engines are hung below the wing using complex mounting devices, also referred to as EMS (engine mounting structure) or mounting pylon. The mounting pylons in normal use have a primary structure, also referred to as the rigid structure, which often takes the form of a box, that is to say constructed by assembling upper and lower spars that are connected to one another by a plurality of transverse reinforcement ribs located inside the box and at the ends thereof. The spars are arranged at the lower and upper faces while lateral panels close the box to form lateral faces. Moreover, the mounting pylon is arranged at the top of the engine, between the engine and the wing box. This is referred to as a "12 o'clock" position.

As is known, the primary structure of these pylons is designed to allow transmission, to the wing, of the static and dynamic forces generated by the engines, such as weight and thrust, but also the various dynamic forces, in particular those linked to fault events such as blade loss (FBO or "fan blade out"), nose gear collapse, dynamic landing, etc.

In mounting pylons known from the prior art, as in the document FR 2 887 522, forces are conventionally transmitted between its primary structure and the wing box by a set of attachment points comprising a front attachment point, a rear attachment point, and an intermediate attachment point, the latter being intended in particular to absorb the thrust forces generated by the engine. These attachment points are conventionally interposed vertically between the wing box and the primary structure of the mounting pylon.

Modern engines have ever larger diameters. For turbofans such as jet engines, the desired large bypass ratio leads to these engines being particularly bulky since increasing the bypass rate inevitably means an increase in the diameter of the engine, and more particularly an increase in the diameter of its fan casing.

Consequently, with a ground clearance that is determined so as to remain acceptable from a safety point of view, the space remaining between the wing element and the engine is increasingly limited. Thus, it becomes difficult to install the mounting pylon and the various wing attachments within this remaining vertical space which is usually set aside for this installation. This is all the more difficult since the forces passing through this region are also of high intensity and require appropriate dimensions for the wing box and the primary structure. Indeed, these elements must have sufficient dimensions to provide the mechanical strength to withstand the transmission of forces from the engine to the wing element, with low deformation under load in order to not impair the aerodynamic performance of the propulsion system.

The prior art contains multiple proposed solutions for bringing the engine as close as possible to the wing element from which it is suspended, with the aim of maintaining the required ground clearance.

Nonetheless, these solutions have to be constantly improved so as to adapt to the ever greater fan casing diameters retained in order to satisfy bypass ratio requirements.

DISCLOSURE OF THE INVENTION

In order to respond to this need for improvement, the invention relates to an assembly for an aircraft, comprising:
- an aircraft wing comprising a wing box made partly by means of a front spar and an intermediate spar;
- an engine mounting pylon arranged beneath the wing, the pylon comprising a primary structure in the form of a box having an upper spar extending at least partly beneath the wing box, and also having a lower spar, lateral panels and also transverse reinforcement ribs; and
- means for attaching the primary structure of the mounting pylon on the wing box.

According to the invention, said attachment means comprise a row of bolts along which each bolt passes through a structural part of the pylon on one hand, and on the other hand a fitting attached to one of said front and intermediate spars.

By virtue of the proposed arrangement, the primary structure of the pylon can be brought as close as possible to the wing. Indeed, using a row of bolts contrasts with the solutions of the prior art in which the attachments usually have elements of significant bulk arranged in the vertical direction, between the pylon and the wing. This advantageously results in a gain in terms of bulk in this same direction, since the pylon can be coupled as close as possible to the wing. Furthermore, attachment by means of a row of bolts permits a more direct transfer of forces between the wing box and the primary structure of the pylon. This leads to a reduction in the secondary moments that result from the offsets created by conventional attachments, which generally use clevises and shackles or articulated rods. This reduction in the secondary moments makes it possible to reduce or to dispense with certain structural reinforcements initially provided within the wing and the pylon in order to cope with these moments. This has the advantageous result of an additional gain in terms of bulk and mass in the vertical direction, which favours the installation of an engine of larger diameter and/or higher installation of the engine in order to increase the ground clearance.

The invention preferably provides at least one of the following optional features, taken in isolation or in combination.

The structural part of the pylon is contiguous with at least one of the lateral panels.

The structural part of the pylon corresponds to one of the transverse reinforcement ribs and the row of bolts is parallel to that one of the front and intermediate spars on which the fitting is attached.

Certain bolts of the row of bolts pass through one of said transverse reinforcement ribs of the primary structure of the pylon, and other bolts of this row pass through another transverse reinforcement rib of the primary structure of the pylon.

The bolts of the row of bolts are split into a first group of bolts and a second group of bolts, with the bolts of the first group of bolts passing through a first transverse reinforcement rib of the primary structure of the pylon and the bolts of the second group of bolts passing through a second transverse reinforcement rib of the primary structure of the pylon, the first and second transverse reinforcement ribs being preferably directly consecutive within the primary structure of the mounting pylon.

The bolts of the first group of bolts are arranged on one side of a vertical and longitudinal median plane of the assembly, and the bolts of the second group of bolts are arranged on the other side of this vertical and longitudinal median plane.

The structural part of the pylon corresponds to an upper bracket of one of the lateral panels.

The upper bracket of said lateral panel is located:
outside the pylon with respect to the lateral panel;
inside the pylon with respect to the lateral panel; or
partly inside the pylon and partly outside the pylon with respect to the lateral panel.

The upper bracket corresponds to at least one non-integral part secured to the lateral panel.

The bolts are arranged in at least two mutually parallel or essentially mutually parallel rows. In particular, these at least two rows are parallel or essentially parallel to that one of the front spar and intermediate spar on which the fitting is attached.

Each fitting attached to either said front or intermediate spar of the wing box is arranged outside this box.

Each fitting attached on either said front or intermediate spar is located in the longitudinal continuity of an inner reinforcement rib of the wing box, the inner reinforcement rib being attached to both the front and intermediate spar of this wing box.

Each fitting attached on either said front or intermediate spar has at least:
a first plate for attachment to the front spar or the intermediate spar;
a second attachment plate cooperating with at least one of said bolts of the row of bolts, said first and second attachment plates being essentially orthogonal to each other; and
preferably lateral flanks that are secured to said first and second attachment plates.

The assembly comprises a liner secured beneath a lower skin of the pressure face of the wing box and arranged between this skin and the primary structure of the pylon, with each bolt of the row of bolts passing through the liner.

Each bolt of the row of bolts comprises a barrel nut received in an orifice of the corresponding transverse reinforcement rib.

At least one bolt of the row of bolts is installed with a tight fit so as to be able to react the forces acting in a longitudinal direction and in a transverse direction of the assembly.

According to one preferred embodiment, said fitting is attached on the front spar of the wing box.

The row of bolts constitutes a front wing attachment, or said front wing attachment further comprises a shear pin for reacting the forces acting in a longitudinal direction and in a transverse direction of the assembly, with the shear pin intercepting the row of bolts.

The row of bolts forms part of a front wing attachment, and said front wing attachment further comprises two shear pins for reacting the forces acting in a longitudinal direction and in a transverse direction of the assembly, with the two shear pins being spaced apart from one another in the transverse direction.

The assembly also comprises a rear wing attachment arranged at a transverse reinforcement rib that closes the rear of the box-shaped primary structure, and the primary structure is attached beneath the wing box solely by means of the front wing attachment and the rear wing attachment.

The rear wing attachment comprises a shear pin that projects to the rear from the transverse reinforcement rib that closes the rear of the primary structure, the shear pin being arranged essentially in a longitudinal direction of the assembly.

The rear wing attachment also comprises at least one shackle through which the shear pin passes.

The rear wing attachment comprises a set of bolts (244), with each bolt passing through a structural part of the pylon on one hand, and on the other hand a fitting secured to the wing.

The rear wing attachment comprises a shear pin for reacting the forces acting in a longitudinal direction and in a transverse direction of the assembly.

Finally, the invention also relates to an aircraft comprising at least one such assembly.

Other advantages and characteristics of the invention will become apparent from the following non-limiting detailed description.

BRIEF DESCRIPTION OF THE DRAWINGS

This description will be provided with reference to the appended drawings, in which:

FIG. 11 is a perspective view of an element of the assembly shown in FIGS. 10 and 10a;

DETAILED DESCRIPTION OF PREFERRED EMBODIMENTS

Figure 1:
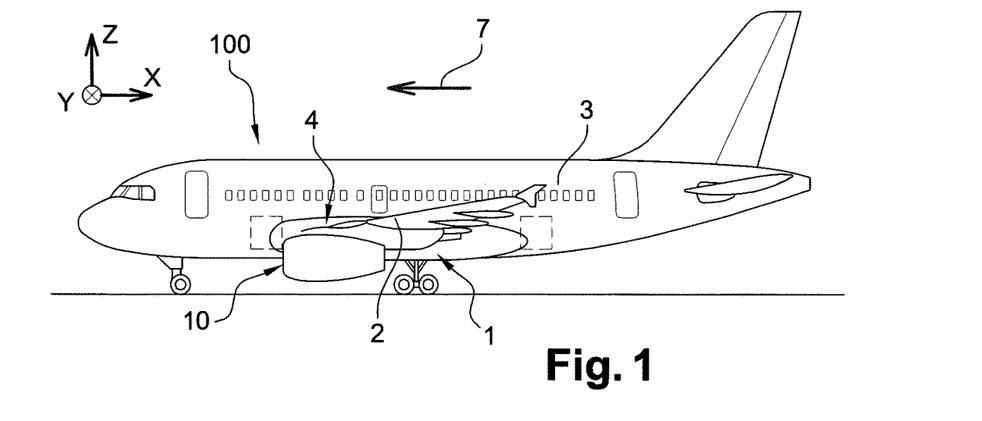
FIG. 1 shows a side view of an aircraft comprising an assembly according to the invention.

FIG. 1 shows an aircraft 100 comprising a fuselage 3 on which there are attached two wings 2 (only one being visible in FIG. 1), each wing being an integral part of an assembly 1 according to the invention. The assembly 1 supports a dual-flow, two-spool engine 10 such as a jet engine. Indeed, this assembly 1 comprises not only the wing 2 but also a pylon 4, for mounting the engine 10, interposed between the wing 2 and this engine.

In all of the following description, by convention, the X direction corresponds to the longitudinal direction of the assembly 1, which can also be considered to be similar to the longitudinal direction of the engine 10, this X direction being parallel to a longitudinal axis of this engine. On the other hand, the Y direction corresponds to the direction oriented transversely with respect to the assembly 1, which can also be considered to be similar to the transverse direction of the engine. Finally, the Z direction corresponds to the vertical or height direction, these three directions X, Y and Z being mutually orthogonal. Consequently, the engine 10 is suspended beneath the assembly 1, in the Z direction.

Moreover, the terms "front" and "rear" are to be considered in relation to a direction of forward movement of the aircraft that takes place as a consequence of the thrust produced by the engines 10, this direction being represented schematically by the arrow 7. By contrast, the terms "upstream" and "downstream" are to be considered in a main direction of flow of the gases through the engine, which direction is counter to the direction 7.

Figure 2:
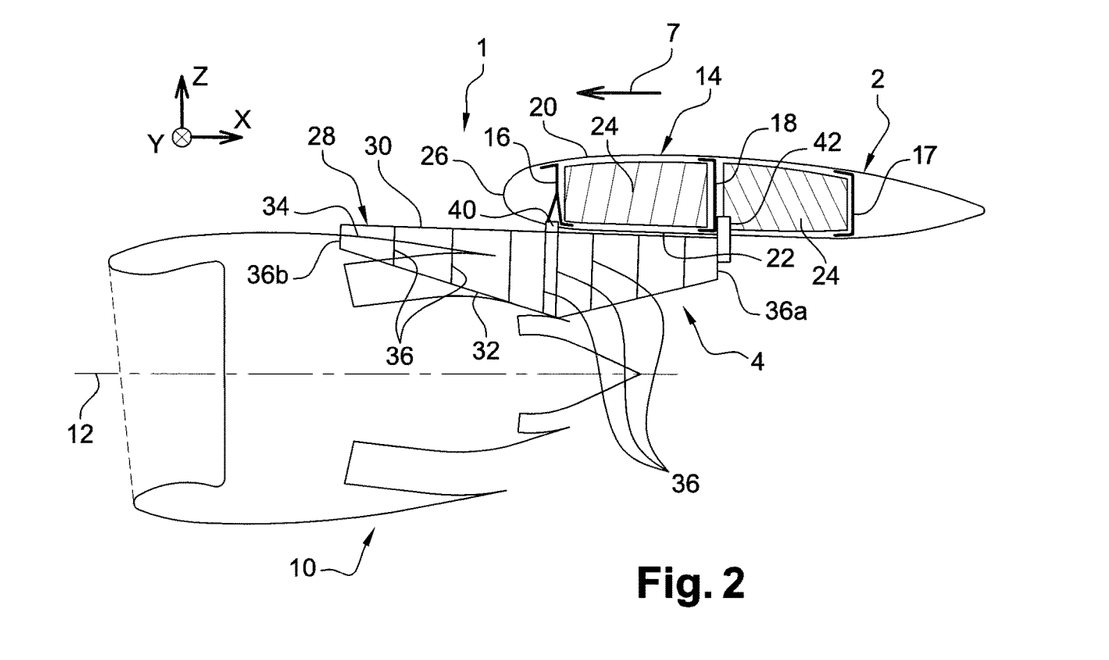
FIG. 2 is a side view, enlarged from FIG. 1, showing the assembly according to the invention with its associated engine.

FIG. 2, now, shows the assembly 1 beneath which is suspended the engine 10, of longitudinal axis 12. The wing 2 of this assembly 1 is of conventional design in that it comprises a wing box 14 extending along a spanwise direction of the wing. The wing box 14 consists of a front spar 16, a rear spar 17, an intermediate spar 18, an upper suction-face skin 20 and a lower pressure-face skin 22. The three spars 16, 17, 18 are preferably essentially parallel, extending in the spanwise direction and spaced apart from one another in a chordwise direction of the wing Essentially longitudinal internal reinforcement ribs 24 are housed within the wing box 14, being attached to each of the four box elements 16, 18, 20, 22 by means of rivets, bolts or similar elements. The ribs 24 could also pass through the intermediate spar 18 to extend to the rear as far as the rear spar 17, or other ribs 24 could be arranged between the intermediate spar 18 and the rear spar 17. Moreover, in front of the wing box 14, the wing 2 comprises a cowling 26 forming the leading edge of the wing.

The other element of the assembly 1, the mounting pylon 4, comprises a primary structure 28 in the form of a box. The other constituent elements, which are not shown, of this pylon 4, of the secondary structure type which separates and holds the systems while supporting aerodynamic fairings, are conventional elements similar to those found in the prior art. For that reason, these will not be described in detail.

The primary structure 28, or rigid structure, serves to transmit, to the wing box 14, the static and dynamic forces generated by the engine 10. The box which it forms extends over the entire length of this primary structure, in the X direction. It is of conventional design, which is to say that it is bounded at the top by an upper spar 30, at the bottom by a lower spar 32, and laterally by lateral panels 34. As shown in FIG. 2, the upper spar 30 is located at least in part beneath the wing box 14. In that regard, it is noted that each one of the above-mentioned elements 30, 32, 34 can be made in one piece or by assembling multiple distinct parts. Moreover, a single part may form all or part of several of these elements 30, 32, 34.

Furthermore, the pylon box 28 is equipped with transverse reinforcement ribs that are preferably arranged essentially in YZ planes and distributed in the X direction. These are internal transverse ribs 36, a transverse reinforcement ribs 36a that closes the rear of the pylon box 28 and is referred to as the rear closing rib, and a transverse reinforcement rib 36b that closes the front of the box and is referred to as the front closing rib.

The pylon box 28 has a YZ cross section in the general shape of a square or a rectangle, the dimension of which changes along the X direction. Preferably, this cross section narrows, from a median portion, in both the forward and rear directions.

The engine 10 is attached to the pylon box 28 in a conventional manner, which will not be set out in this patent application. This is done by conventional engine attachments, which will be familiar to a person skilled in the art. By contrast, one of the characterizing features of the invention lies in the design of the means for attaching the pylon box 28 to the wing box 14, these means consisting in this case of two wing attachments 40, 42 which will now be described with reference to FIGS. 3 to 18.

Represented first of all, and with reference to FIGS. 3 to 6 which show a first exemplary embodiment of the invention, is a first variant embodiment of the front wing attachment 40 which in this case consists of a row of bolts. The bolts 44 are oriented essentially in the Z direction and are spaced apart from one another along an imaginary line 46 that is parallel to the front spar 16 of the wing box 14.

Each bolt 44 first passes through a fitting 50 that is attached to the front spar 16 of the wing box 14. More precisely, the fitting 50 is attached outside the box 14 and in front of the latter, in the longitudinal continuation of one of the internal reinforcement ribs 24 of the wing box.

Figure 5:
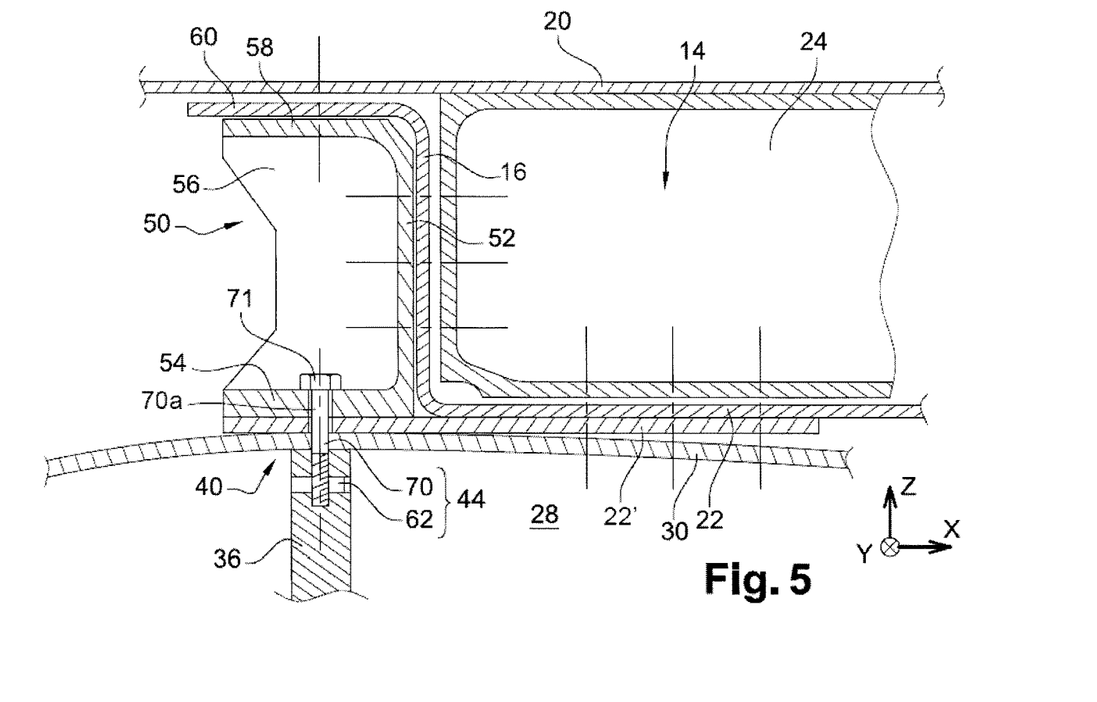
FIG. 5 is a view in section considered along line V-V of FIG. 4.

This fitting 50 can take various shapes, including that of an angle bar. Preferably, it comprises a first attachment plate 52 which is parallel to the front spar 16 and attached thereto by means of bolts (not shown). It also comprises a second attachment plate 54 that cooperates with at least one, and preferably just one, of the bolts 44. This second plate 54 is essentially parallel to the upper spar 30 of the pylon box 28, and thus essentially orthogonal to the first plate 52, as shown in FIG. 5. Moreover, the fitting 50 comprises two lateral flanks 56 that are secured to the first and second attachment plates 52, 54. Finally, the fitting 50 may comprise an upper plate 58 that is essentially parallel to the second plate 54 and is attached by means of bolts to a longitudinal extension 60 of the front spar 16. The plates 52, 54, 58 and two lateral flanks 56 are preferably made in one piece, for example by machining from a block of material.

These are multiple fittings 50 in succession along the front spar 16, each one of them being associated with a single bolt passing through its second plate 54.

Figure 3:
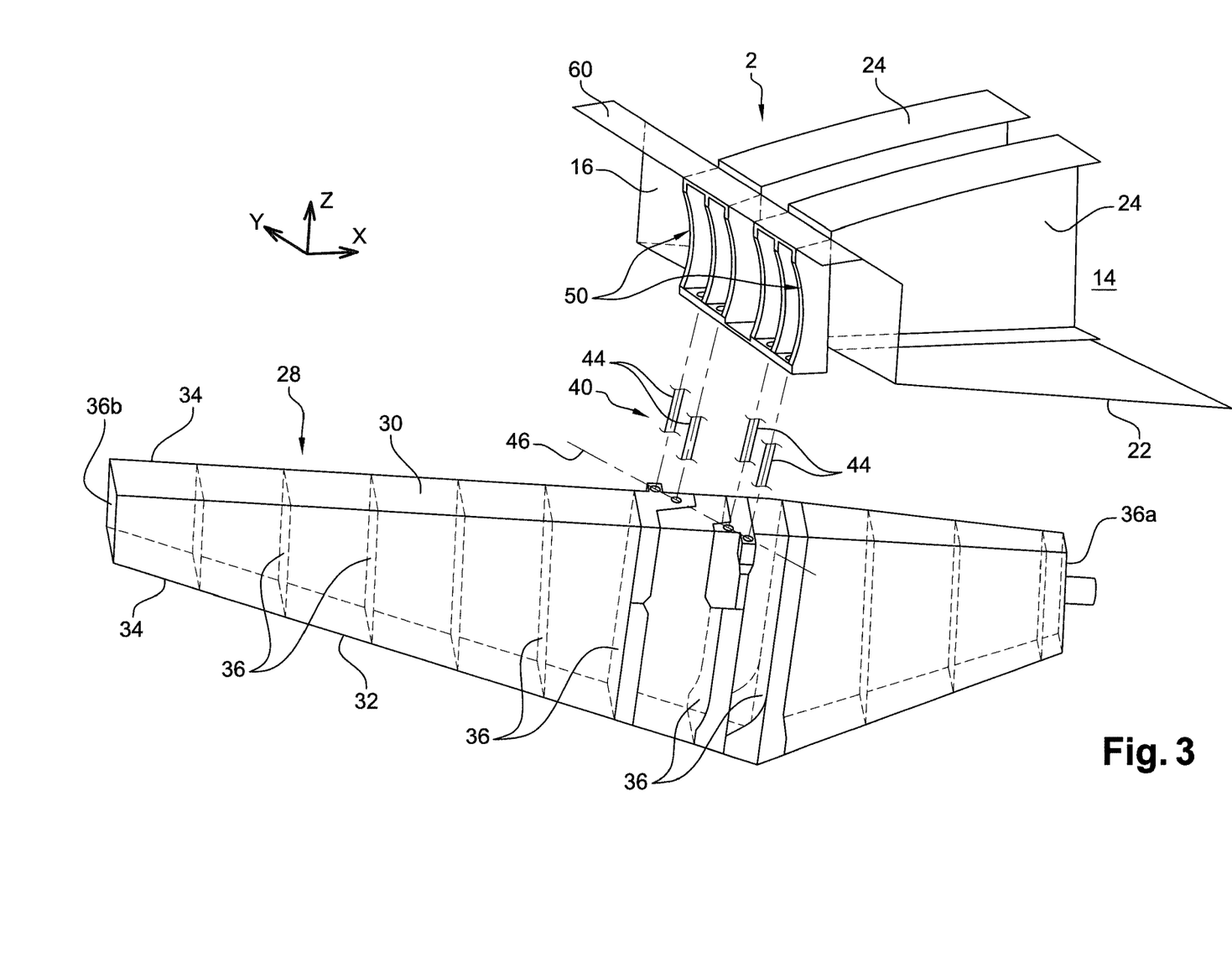
FIG. 3 is a partially exploded perspective view of a preferred embodiment of a first exemplary embodiment of the assembly shown in the preceding figure.

In one preferred embodiment, a liner 22' is attached beneath the lower skin 22, in line with the front wing attachment 40, with each bolt 44 passing through it (the liner 22' is not shown in FIG. 3). This attachment is done by means of bolts, rivets or similar elements. The liner 22' extends forward beyond the front spar 16, below the fitting 50, preferably without being directly attached to the latter. It takes the form of a skin that is clamped against the lower skin 22 of the wing box. The function of this liner 22' is to drain/distribute the shear forces contained in the XY plane, in a large part of the lower skin 22.

In this first variant embodiment, each bolt 44 finally passes through the upper portion of a structural part of the pylon corresponding to one of the internal transverse reinforcement ribs 36 of the pylon box 28. To that end, the upper portion of the ribs 36 in question is preferably reinforced, having portions that project outwardly relative to the box, in the Y and/or Z directions. These reinforcements are generally created in one piece with the rib, or are fixedly attached thereto. Among the envisaged reinforcements, some located on the outside of the pylon box 28 serve to easily house a barrel nut 62 forming an integral part of a bolt 44. Indeed, and as is more clearly visible in FIG. 6, the barrel nut 62 can easily be inserted into an orifice 64 of a rib reinforcement 66 located outside the box. It will be remembered that a barrel nut is, in general terms, a nut having a cylindrical outer surface the axis of which is perpendicular to the axis of the tapped hole 68 passing through it. A barrel nut may, as required, be made in one piece or two pieces. This type of nut is also referred to as a shank nut or sleeve nut. It is preferably the choice for each one of the bolts 44. Other types of nut may nonetheless be used, such as conventional hexagonal nuts, without departing from the scope of the invention.

This is nut 62 cooperates with an element 70 having a threaded end, so as to together form the bolt 44. The element 70 having a threaded end also comprises a smooth stem 70a in line therewith, and an integral or attached head 71.

Figure 6:
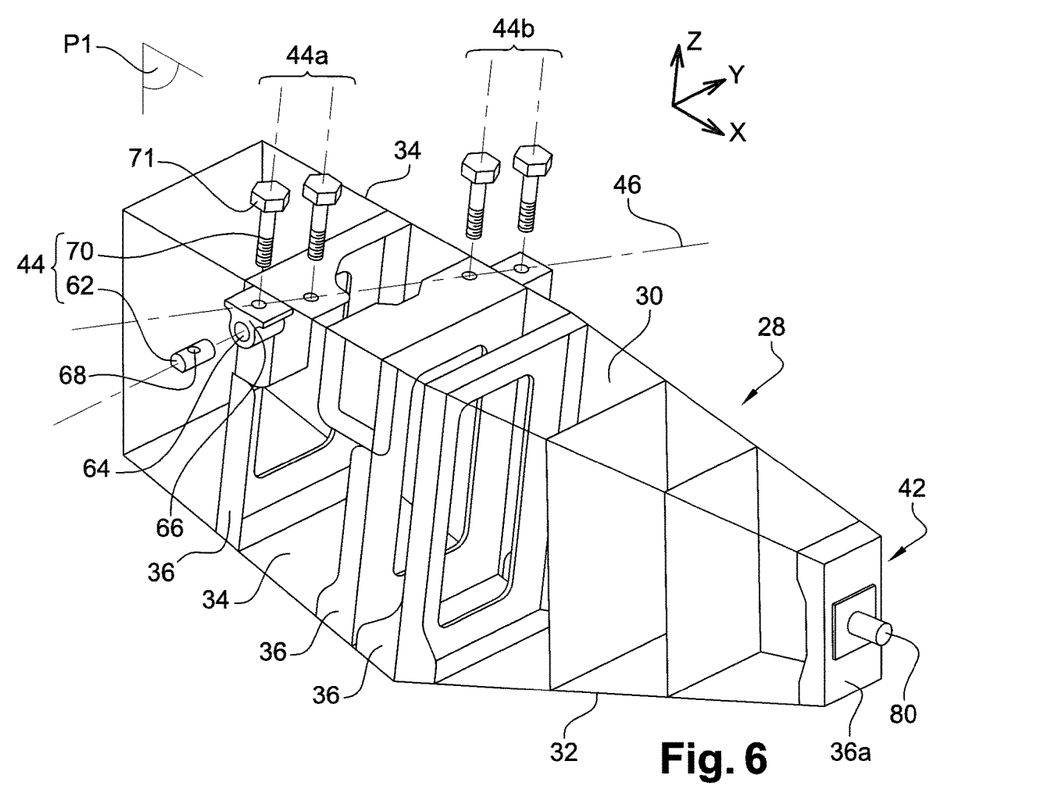
FIG. 6 is a partially exploded perspective view of a portion of the assembly shown in FIGS. 3 to 5.

The smooth stem part 70a is tightly fitted into the parts through which it passes, such that each bolt 44 can react not only the forces acting in the Z direction but also the forces acting in the X and Y directions. The parts passed through are, in succession in the Z direction, the second plate 54 of the fitting 50 housed in the wing, the liner 22' attached to the lower skin 22 of the wing, the upper spar 30 of the pylon box 28, and the internal rib 36. However, the rib 36 can have a reinforcement that is located outside or within the plane of the upper spar 30, as shown in FIG. 6, such that the threaded element 70 passes directly through this reinforced rib 36 after exiting the liner 22' attached to the lower skin 22 of the wing, without passing through the upper spar 30.

In order to ensure that the shear forces in the X and Y directions pass essentially through the lower skin 22, the smooth stem 70a of each bolt 44 may pass with a tight fit only through the liner 22', and not the second plate 54.

It is noted that along the row of bolts, the vertical spacing between the wing box 14 and the upper spar 30 of the pylon box 28 may vary. In order to cope with this difference in vertical spacing, the fittings 50 may have different heights depending on their position along the row of bolts, as depicted schematically in FIG. 3. Alternately, the ribs 36 might have a variable projecting height in order to address this problem, or again the liner 22 might be replaced with a shim of progressive thickness, as presented hereinbelow. Of course, it would also be possible to combine some or all of these solutions with a view to compensating for vertical play between the two boxes 14, 28.

In the preferred embodiment which is described, there are provided four fittings 50, each associated with one of the bolts 44. The latter are then split into two groups, specifically a first group 44a of two bolts located on one side of a vertical and longitudinal median plane P1 of the assembly 1, and a second group 44b of two bolts located on the other side of this median plane P1. The bolts 44 of the first group 44a both pass through one and the same first transverse rib 36, while the bolts 44 of the second group 44b both pass through one and the same second transverse rib 36, preferably directly consecutive from the first rib in the X direction.

Preferably, a rib 24 is associated with each one of the two aforementioned groups. Consequently, each one of these two ribs 24, provided within the wing box 14 between the intermediate spar 18 and the front spar 16, cooperates with two fittings 50.

Figure 4:
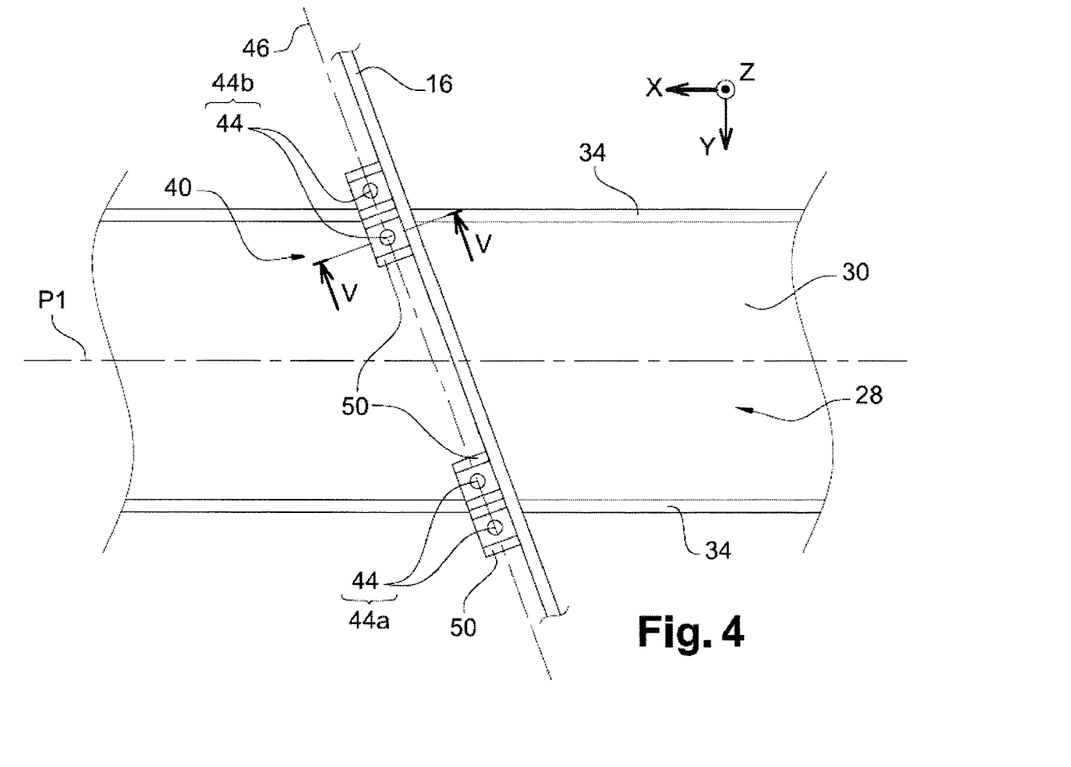
FIG. 4 is a schematic top view of the assembly shown in FIG. 3.

It must also be noted, with reference more specifically to FIG. 4, that the two bolts 44 of each group are arranged essentially symmetrically with respect to the lateral panel 34 associated with this group. In that regard, it is noted that each lateral panel 34 is located essentially in one and the same plane as the web of the wing box rib 24 associated with the group of bolts.

Figure 7:
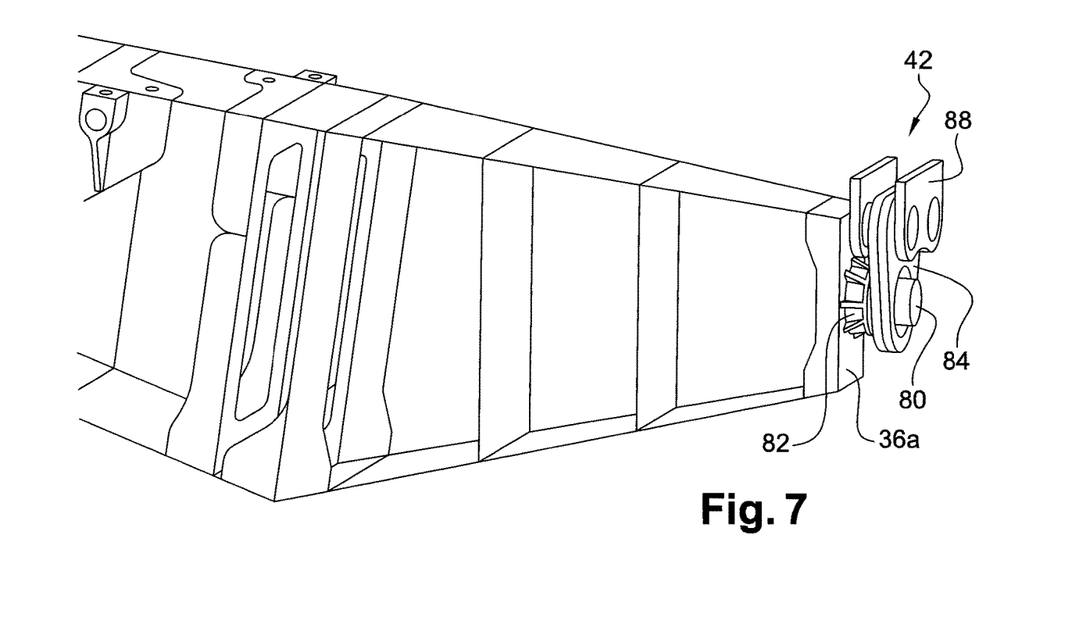
FIG. 7 is another perspective view of a portion of the assembly shown in FIGS. 3 to 6, showing the rear wing attachment in greater detail.
Figure 8:
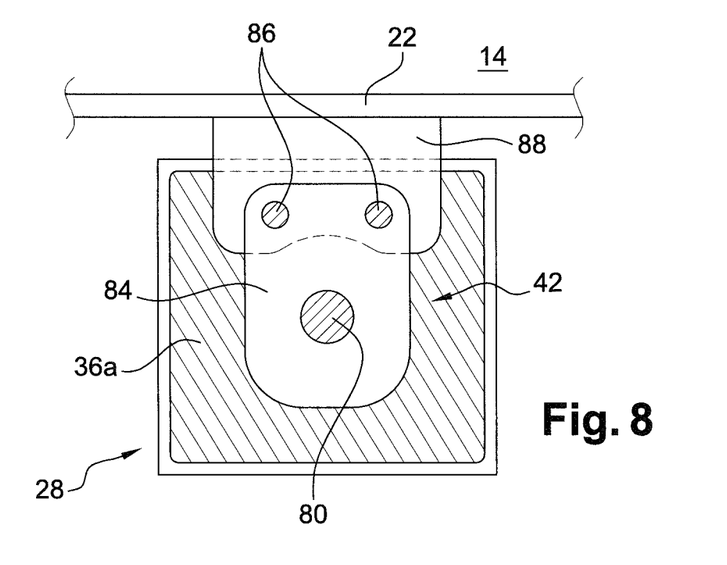
FIG. 8 is a view from the rear of that shown in the preceding figure.

With reference, now, to FIGS. 6 to 8, there follows a description of a first variant embodiment of the rear wing attachment 42. This is arranged at the rear closing rib 36a. It comprises an attachment (referred to as a "spigot") formed with a shear pin arranged essentially in the X direction. This shear pin 80 projects to the rear from the closing rib 36a, being supported by a reinforcement 82 secured to this fitting 36a. It passes through a triangular shackle 84 through which two other longitudinal axes 86, that also pass through a clevis 88 secured to the skin 22 of the wing box, also pass.

Figure 9:
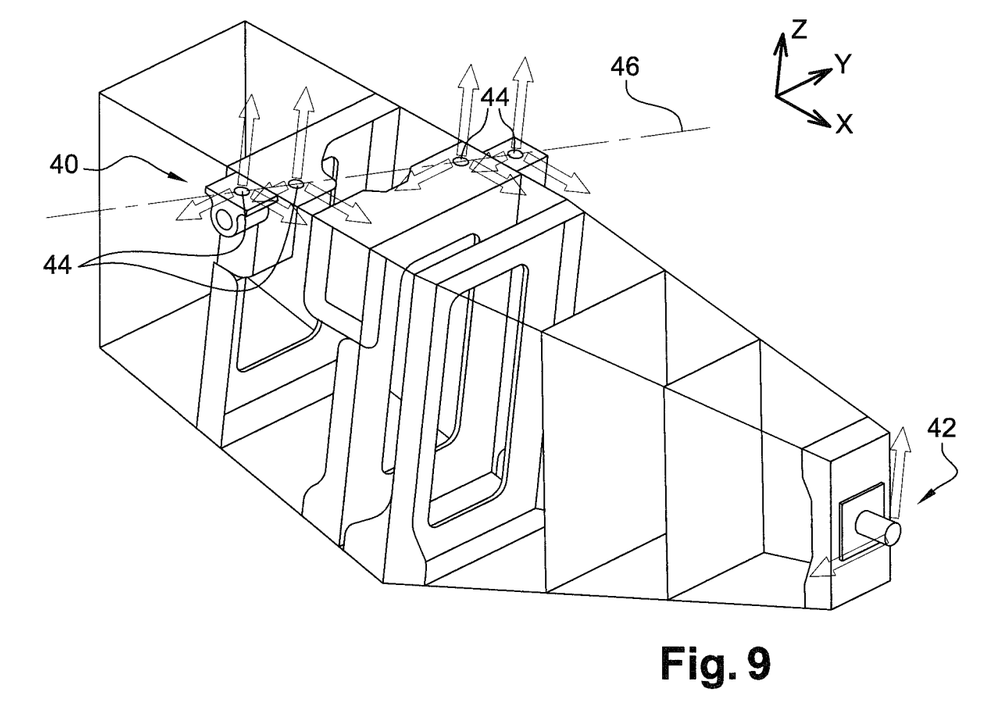
FIG. 9 is a perspective view similar to that of FIG. 6, showing schematically the reaction of forces provided by the front and rear wing attachments.

FIG. 9, now, shows the manner in which the two wing attachments 40, 42 react forces. As previously stated, each bolt 44 of the front wing attachment 40 reacts forces in all three directions X, Y, Z, while the rear wing attachment 42 reacts forces in the Y and Z directions. This configuration offers, first of all, the advantage that these attachment means 40, 42 have a low degree of static indeterminacy, which makes the assembly easier to assemble. Moreover, the row of bolts 44 behaves as a single line of rotation and thus makes it possible to react the forces linked to the moment in the Y direction together with the rear attachment 42. The large distance between these two attachments 40, 42 thus makes it easy to react these forces linked to the moment in the Y direction, without introducing localized forces of excessive magnitude in the boxes 14, 28.

Moreover, in the event of a landing or crash in which the landing gear collapses, the row of bolts 44 can act perfectly well as a desired weak point so as to cause the engine to detach by fracture of this row of bolts.

Finally, the use of a row of bolts 44 reduces the space taken up by the attachment means in the vertical direction, meaning that the pylon can then be coupled as close as possible to the wing. This also permits a more direct transfer of forces between the wing box and the pylon box and, by virtue of the resulting reduction in secondary moments, it is possible to reduce or to dispense with certain structural reinforcements in the wing and in the pylon. This facilitates the installation of a larger-diameter engine.

Figure 10:
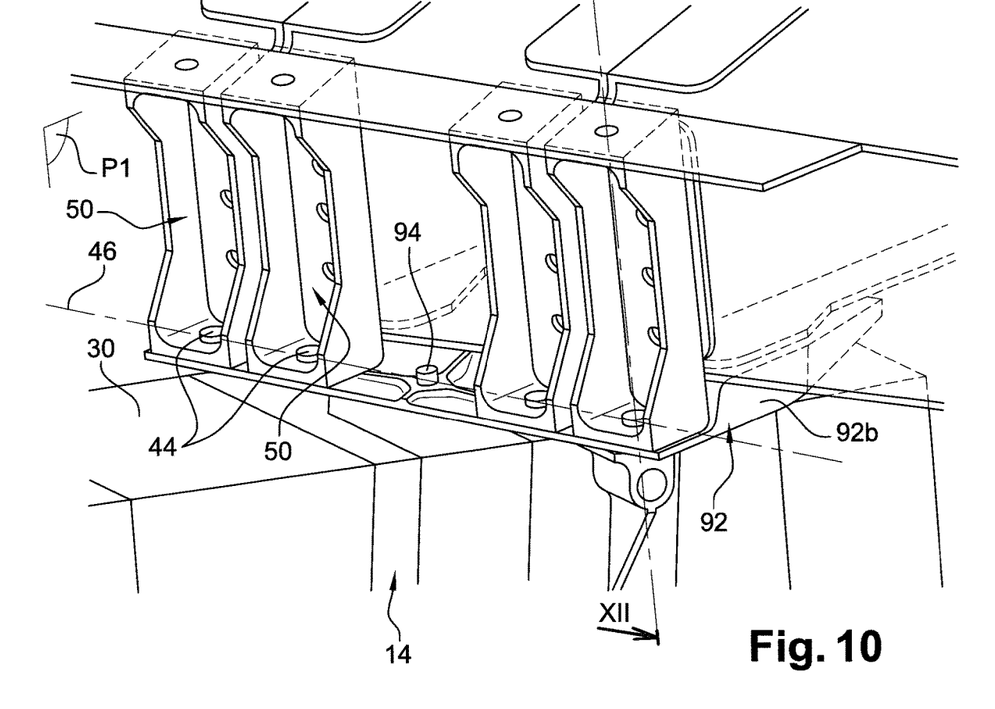
FIG. 10 is a perspective view of a portion of an assembly presented in another preferred embodiment of the first exemplary embodiment of the invention.
Figure 10A:
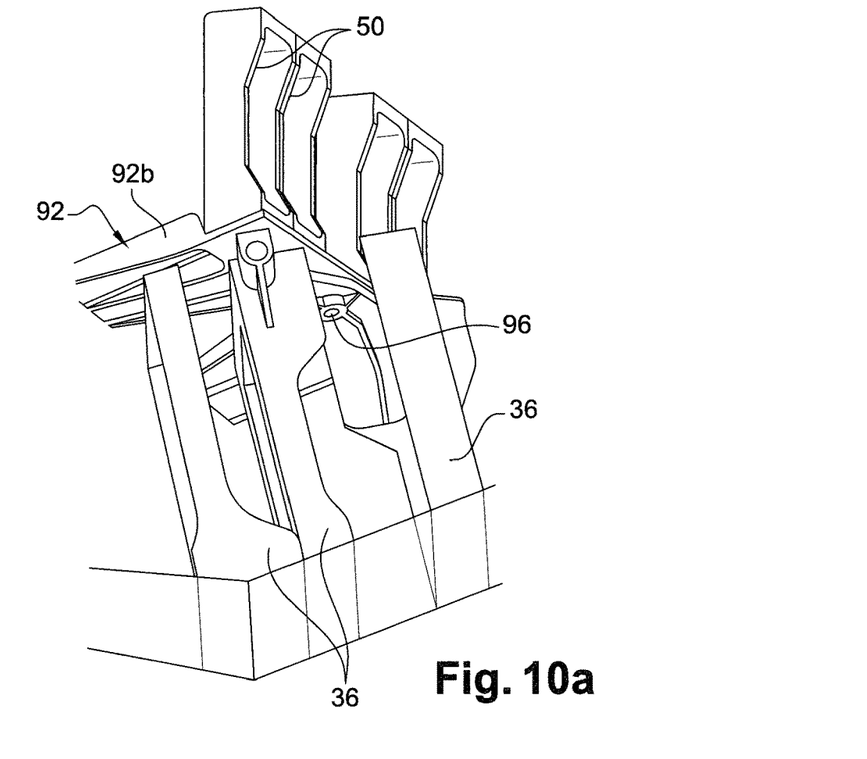
FIG. 10a is a perspective view showing a portion of the assembly shown in the preceding figure, from a different viewing angle.
Figure 11:
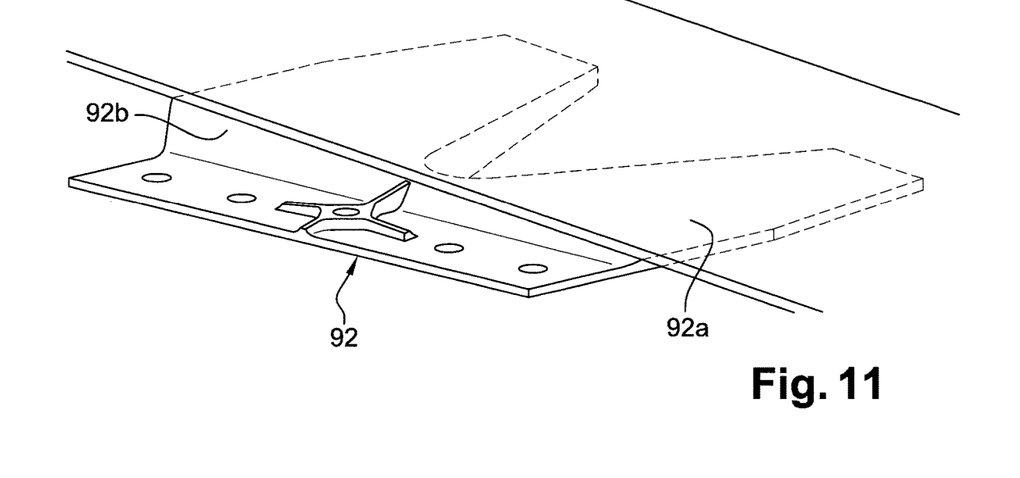
Figure 12:
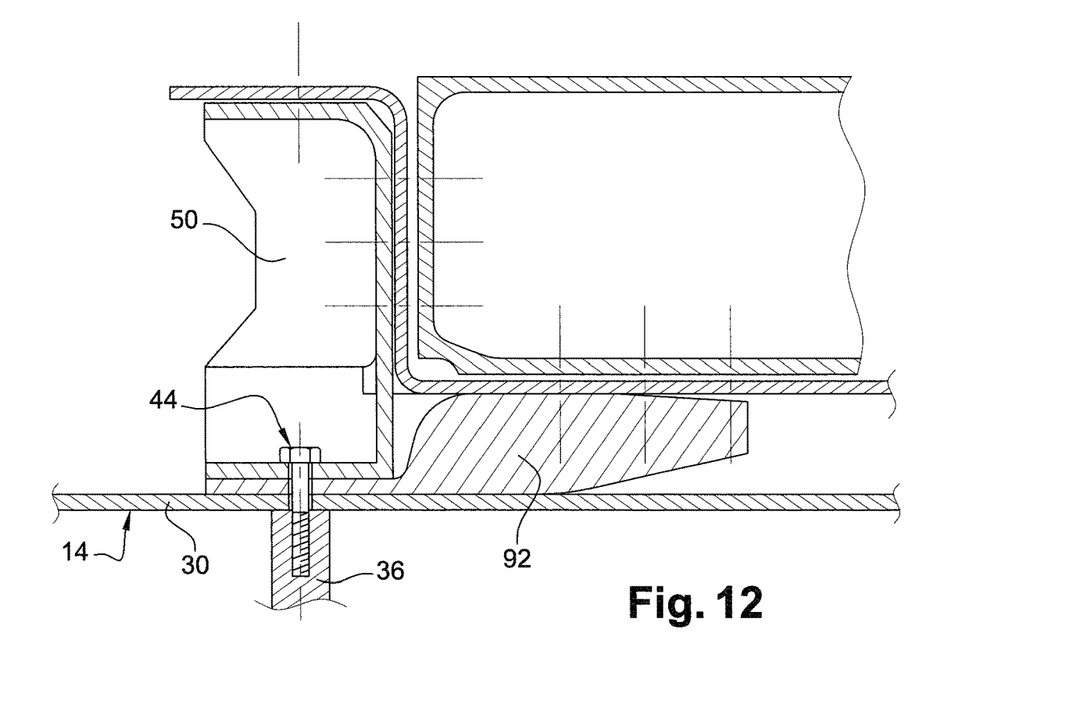
FIG. 12 is a view in section considered along line XII-XII of FIG. 10.
Figure 13:
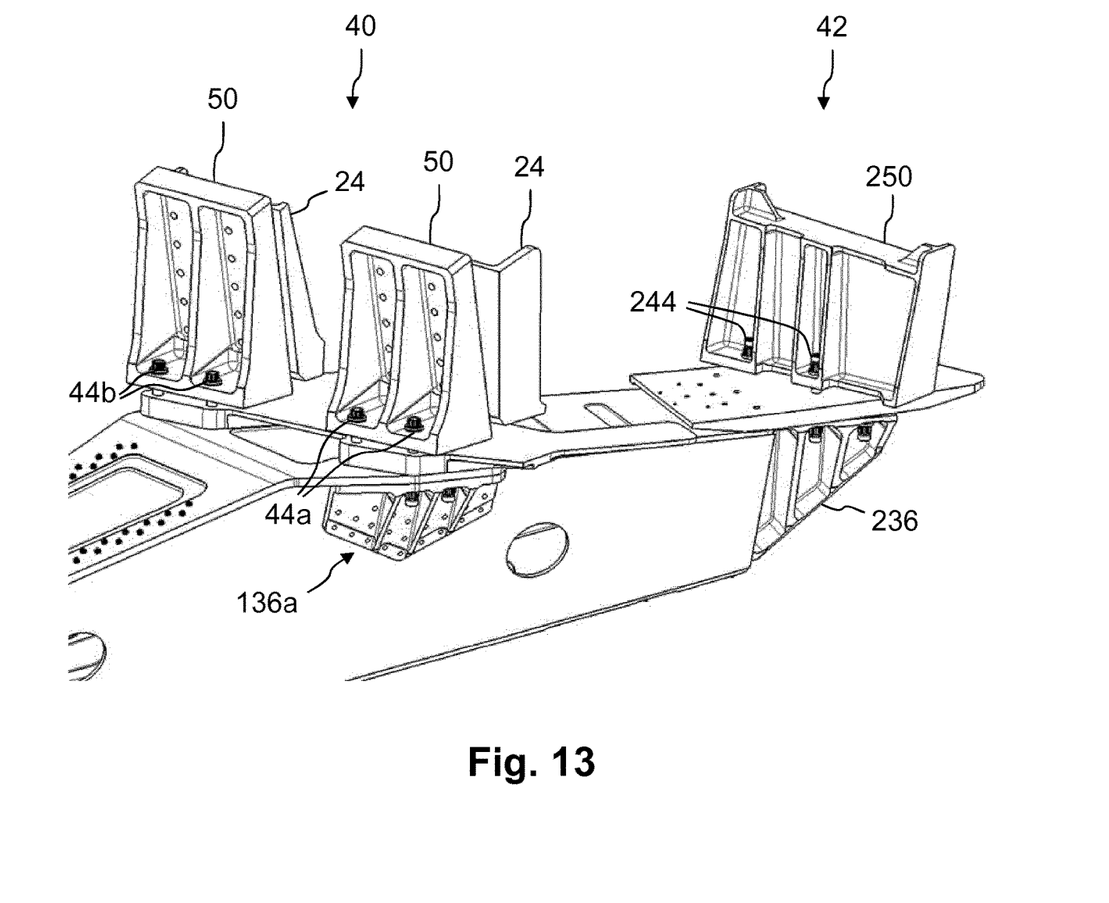
FIG. 13 is a view, from a first perspective, of a preferred embodiment of a second exemplary embodiment of the assembly shown in FIG. 2.
Figure 14:
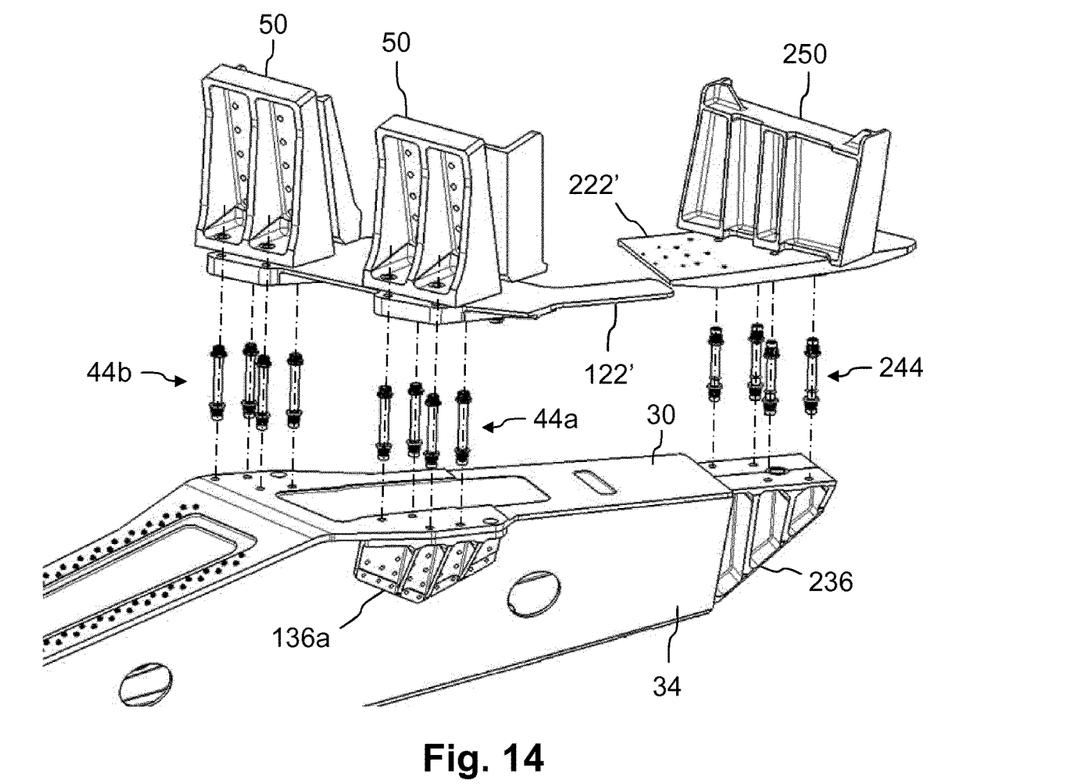
FIG. 14 is a partially exploded view, from the first perspective, of the preferred embodiment shown in FIG. 13.
Figure 15:
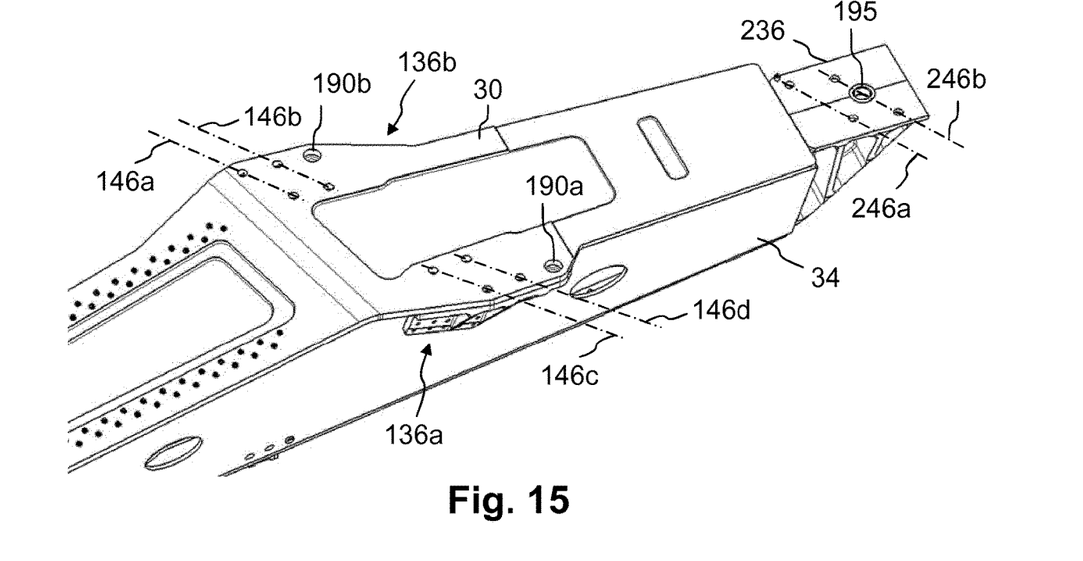
FIG. 15 is a detail view, from a perspective that is slightly different from the first perspective, of a pylon shown in FIG. 14.
Figure 16:
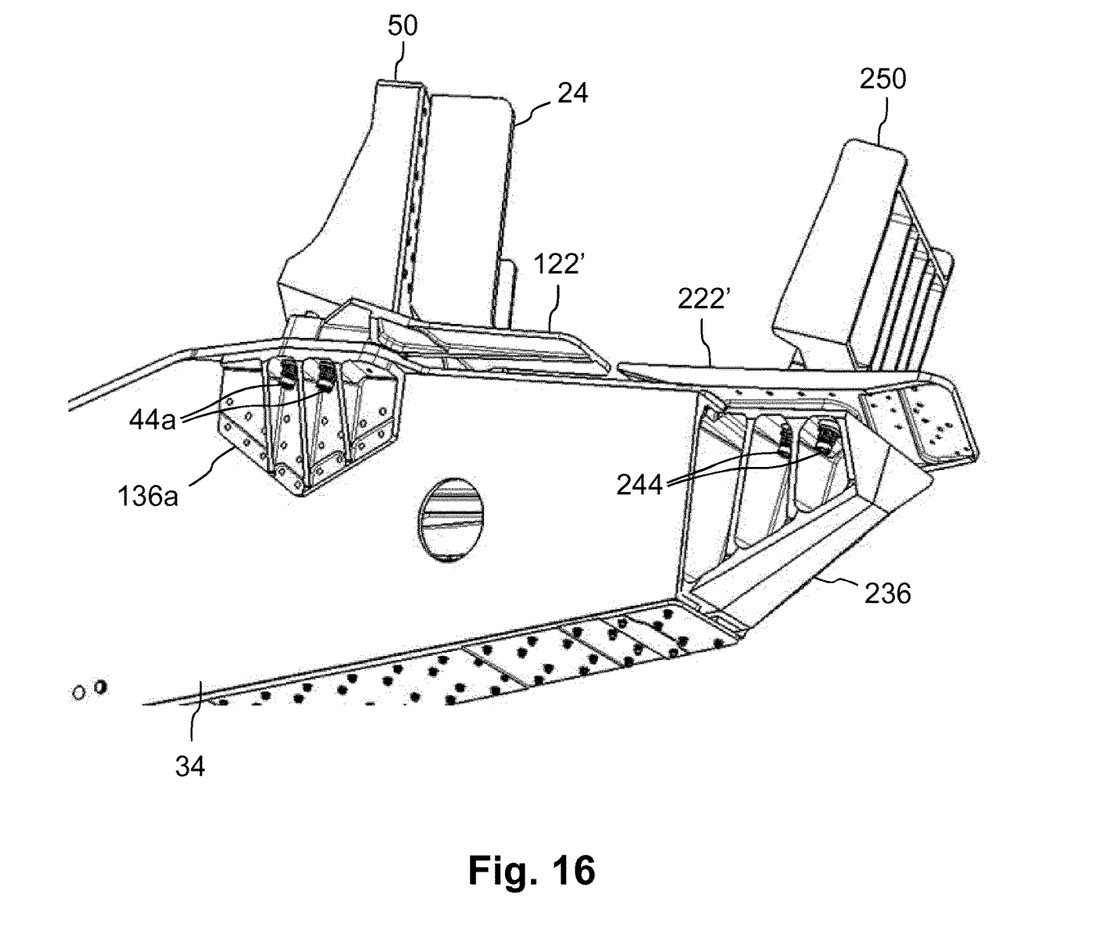
FIG. 16 is a view, from a second perspective, of the preferred embodiment shown in FIG. 13.
Figure 17:
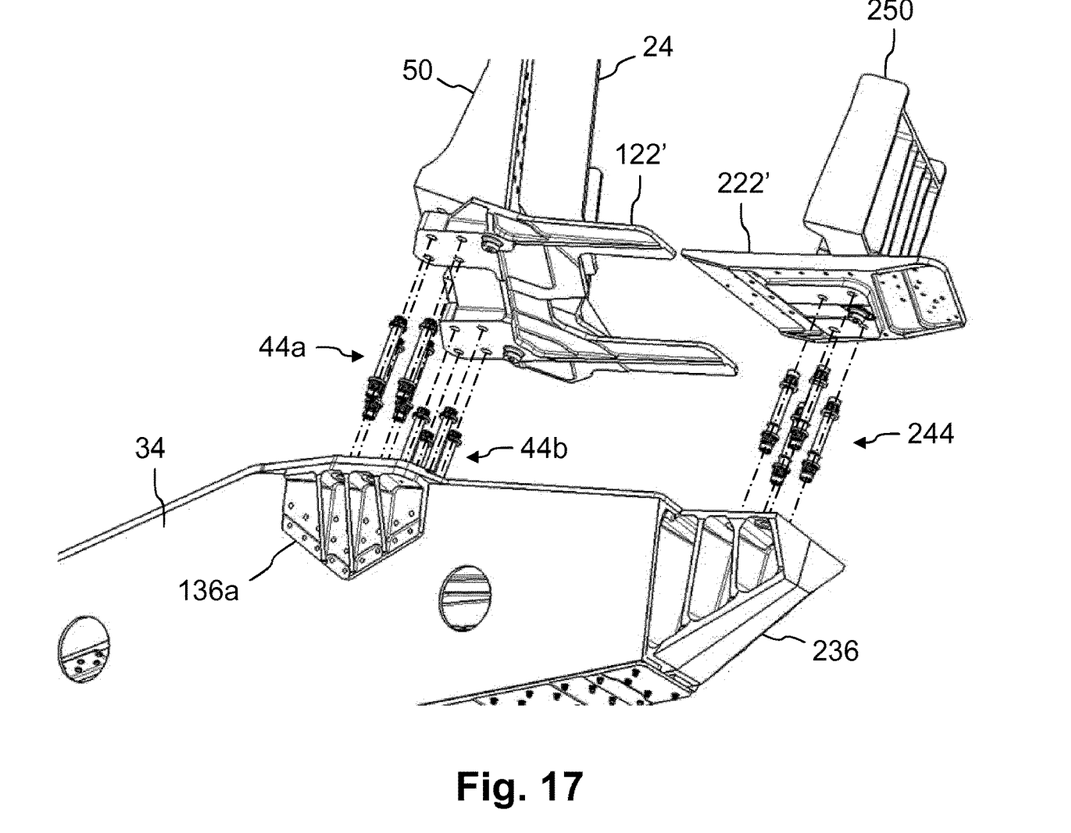
FIG. 17 is a partially exploded view, from the second perspective, of the preferred embodiment shown in FIG. 16.
Figure 18:
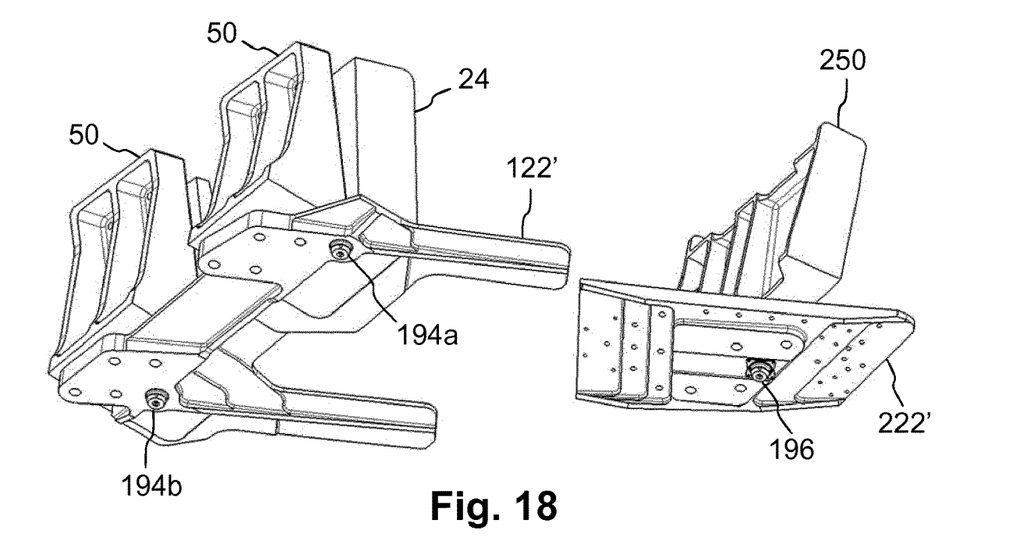
FIG. 18 is a detail perspective view of the upper part of FIG. 17.

According to another embodiment, shown in FIGS. 10 to 12, there is provided a shim 92 for compensating for vertical play between the fittings 50 of the wing and the pylon box 24. This shim 92, which then replaces the liner 22', has a different thickness in its part 92a located below the first group of bolts and in its part 92b located below the second group of bolts since the vertical play is different in these locations. Thus, each one of the bolts 44 passes through this shim 92 at different thicknesses, and the shim is clamped between the fittings 50 and the upper spar 30 of the pylon box 28.

Finally, it is noted that, as an alternative to the solution of the bolts 44 each reacting forces in all three directions X, Y and Z, it would be possible for these bolts to not have a tight fit and to react forces only in the Z direction. In this case, the front wing attachment 40 could additionally have a "spigot", that is to say a shear pin 94, shown in FIG. 10, which is oriented essentially in the Z direction so as to react forces in the X and Y directions. This pin 94, the axis of which intercepts the line 46, preferably cooperates with the shim 92 as shown in FIG. 10, and with a reinforcement fitting 96 shown in FIG. 10a. This reinforcement fitting 96 connects the two ribs 36 of the pylon box which cooperate with the bolts 44 so as to allow the pin 94 to be centered, fitting into the median plane P1.

With reference to FIGS. 13 to 18, which show a second exemplary embodiment of the invention, there is shown a second variant embodiment of the front wing attachment 40. As in the first variant embodiment, the front wing attachment 40 comprises at least one row of bolts. These bolts 44a, 44b are oriented essentially in the Z direction and are spaced apart from one another along imaginary lines 146a, 146b, 146c, 146d which are mutually parallel or essentially mutually parallel.

Each bolt 44a, 44b first passes through a fitting 50 that is attached to the front spar 16 of the wing box 14. More precisely, the fitting 50 is attached outside the box 14 and in front of the latter, in the longitudinal continuation of one of the internal reinforcement ribs 24 of the wing box. This fitting 50 is similar to that described with reference to FIGS. 3 to 6, and consequently no further description thereof will be provided.

In one preferred embodiment, a liner 122' is secured beneath the lower skin of the pressure face 22 (not shown in the figures), in line with the front wing attachment 40, with each bolt 44a, 44b passing through it. In this second variant embodiment, each bolt 44a, 44b finally passes through the upper portion of a structural part of the pylon corresponding to an upper bracket 136a, 136b of a lateral panel 34 of the pylon 4. In a first alternative, this upper bracket corresponds to a portion of the lateral panel 34 that is folded back essentially perpendicular to the rest of the lateral panel 34 such that this folded-back portion is located in the XY plane. In a second alternative, this upper bracket corresponds to at least one non-integral part secured to the lateral panel 34. Preferably, and as shown in FIGS. 13 to 18, this non-integral part is a fitting 136a, 136b that is securely fixed to the lateral panel 34. A fitting 136a is securely fixed to the lateral panel 34 shown in the figures. Another fitting 136b is securely fixed to the other lateral panel of the pylon 4. Owing to the viewing angle of the figures, neither this other fitting 136b nor the other lateral panel is shown in the figures. Preferably, each fitting is securely attached to one of the lateral panels 34, against the outer face of said lateral panel (the term outer face indicating in this context that face of the lateral panel which is oriented toward the exterior of the pylon). Thus, the two fittings 136a and 136b are as remote from one another as possible, which has the advantage for the attachment 40 of being stronger with respect to forces linked to moments in the Y direction.

Preferably, and as shown in the figures, the shape of the upper spar 30 is such that it covers the upper brackets of the lateral panels 34, these upper brackets corresponding for example to the fittings 136a and 136b.

In the second variant embodiment, the front attachment 40 thus comprises two groups of bolts: a first group of bolts 44a passing through the fitting 136a and a second group of bolts 44b passing through the fitting 136b. The bolts of each group of bolts are spaced apart from one another along at least one imaginary line 146a, 146b, 146c, 146d. Preferably, in the example shown in FIGS. 13 to 18, the bolts of each group of bolts are spaced apart from one another along at least two imaginary lines 146a, 146b in the case of the second group and 146c, 146d in the case of the first group. This arrangement along multiple lines makes it possible to increase the number of bolts and consequently the forces that can be transmitted by the front attachment 40, for a given lateral bulk (along the Y axis) of the pylon. The lines 146c of the first group of bolts and 146a of the second group of bolts are not necessarily aligned. Similarly, the lines 146d of the first group of bolts and 146b of the second group of bolts are not necessarily aligned. However, preferably, these different lines are mutually parallel or essentially mutually parallel. For the sake of clarity of the description, it is specified that in the assembly of the description two lines are considered to be essentially parallel if they form between them an angle of less than 5° and preferably less than 3°. Preferably, the various lines 146a, 146b, 146c, 146d are parallel or essentially parallel to the front spar 16 of the wing box 14. Preferably, although not necessarily, the lines 146a and 146b are aligned, as is the case for lines 146b and 146d.

However, in particular cases, especially when there are installation constraints owing to the configuration of structural elements of the wing and/or of the pylon, it is possible for certain rows of bolts to not be parallel or essentially parallel to the front spar 16 of the wing box 14.

Without departing from the scope of the invention, in one particular embodiment the upper bracket of a lateral panel is located partially within the pylon 4 and partially outside the pylon with respect to this lateral panel. Thus, the upper bracket extends on either side of the vertical portion (also referred to as the vertical web) of the lateral panel. The row of bolts comprises at least one bolt passing through that portion of the upper bracket located within the pylon and at least one bolt passing through that portion of the upper bracket located outside the pylon. Each portion of the upper bracket may correspond to a portion of the lateral panel that is folded back so as to be perpendicular to the rest of the lateral panel, or to a fitting securely attached to the lateral panel. Thus, according to a first alternative, the two portions of the upper bracket correspond to folded-back portions of the lateral panel, the upper portion of which is then T-shaped. According to a second alternative, these two portions of the upper bracket of the lateral panel correspond to fittings securely attached to the lateral panel, one on an inner face, the other on an outer face of the lateral panel. According to a third alternative, one of the portions of the upper bracket corresponds to a portion of the lateral panel that is folded back so as to be perpendicular to the rest of the lateral panel, and the other portion corresponds to a fitting securely attached to the lateral panel.

As in the first variant embodiment, the front attachment 40 may additionally have a "spigot", that is to say a shear pin. This shear pin is oriented essentially in the Z direction so as to react forces in the X and Y directions. According to a first alternative, a single shear pin 94 is implemented, as in the first variant. This shear pin is then located between the two groups of bolts 44a and 44b, for example essentially equidistant from the two lateral panels 34 of the pylon. According to a second alternative, shown in FIGS. 13 to 18, two shear pins 194a and 194b are implemented. The first shear pin 194a is located close to the first set of bolts 44a and the second shear pin 194b is located close to the second set of bolts 44b. The first shear pin 194a cooperates with a bore 190a created in the upper spar 30 and/or in the first fitting 136a secured to the lateral panel 34. The second shear pin 194b cooperates with a bore 190b created in the upper spar 30 and/or in the second fitting 136b secured to the other lateral panel. Implementing the two shear pins spaced apart from one another in the Y direction allows the attachment 40 to be stronger with respect to forces linked to moments in the Y direction. The more these two shear pins are spaced apart from one another, the greater this strength.

FIGS. 13 to 18, relating to the second exemplary embodiment of the invention, also illustrate a second variant embodiment of the rear attachment 42. In this second variant, the rear wing attachment 42 comprises a set of bolts 244, with each bolt passing through a structural part 236 of the pylon 4 on one hand, and on the other hand a fitting 250 secured to the wing 2. This fitting 250 is preferably located within the wing, against a lower pressure-face skin 22 (not shown in FIGS. 13 to 18 for reasons of clarity) of the wing 2. The fitting 250 is secured to the wing. It is for example attached between two internal reinforcement ribs 24. It may also be attached on the intermediate spar 18 of the wing box. Preferably, the structural part of the pylon corresponds to a fitting 236 attached to a rear portion of the pylon box. This fitting 236 is for example attached to the rear closing rib 36a that closes the rear of the pylon box 28. The bolts 244 are oriented essentially in the Z direction and are spaced apart from one another along imaginary lines 246a, 246b. Preferably, these imaginary lines are essentially parallel to the front spar 16 of the wing box 14. These bolts pass through the fitting 250, the lower pressure-face skin 22 and the structural part of the pylon corresponding to the fitting 236.

Alternately, the structural part of the pylon may correspond to the rear closing rib 36a and/or to a transverse reinforcement rib 36 located close to the rear closing rib 36a. According to another alternative, the structural part of the pylon may correspond to upper brackets of the lateral panels 34, these brackets being for example similar to the two fittings 136a and 136b described with reference to the second variant of the front attachment 40.

In one preferred embodiment, a liner 222' is attached beneath the lower skin 22, in line with the rear wing attachment 42, with each bolt 244 passing through it.

The rear attachment according to the second variant embodiment has the characteristic of having a high degree of static indeterminacy.

Also, the rear wing attachment 42 may additionally have a "spigot", that is to say a shear pin 196, which is oriented essentially in the Z direction so as to react forces in the X and Y directions. This pin 196 preferably cooperates with a bore 195 of the fitting 236, as shown in FIGS. 13 to 18. In the example shown in FIG. 15, its axis intercepts the line 246b. The shear pin 196 is preferably centered laterally in the fitting 236, that is to say that it fits into the median plane P1.

The rear wing attachment 42 according to the above-described second version may also be combined with the first version of the front wing attachment 40. The rear wing attachment 42 according to the first version may also be combined with the second version of the front wing attachment 40.

It will, of course, be appreciated that various modifications can be made, by persons skilled in the art, to the invention which has just been described, purely by way of non-limiting examples. For example, it is possible to combine the various preferred embodiments described hereinabove. Moreover, the row of bolts might alternately cooperate with the intermediate spar of the wing box, without departing from the scope of the invention.

The invention claimed is:

1. An assembly for an aircraft, comprising:
an aircraft wing comprising a wing box made partly by a front spar and an intermediate spar;
an engine mounting pylon arranged beneath the wing, the pylon comprising a primary structure in the form of a box having an upper spar extending at least partly beneath the wing box, and a lower spar, lateral panels and transverse reinforcement ribs; and
means for attaching the primary structure of the mounting pylon on the wing box,
wherein said attachment means comprise a row of bolts along which each bolt passes through one of the transverse reinforcement ribs, and a fitting attached to one of said front and intermediate spars parallel to the row of bolts, and
wherein certain bolts of the row of bolts pass through one of said transverse reinforcement ribs of the primary structure, and wherein other bolts of the row pass through another transverse reinforcement rib of the primary structure.

2. The assembly as claimed in claim 1, wherein the bolts of the row of bolts are split into a first group of bolts and a second group of bolts, the bolts of the first group of bolts passing through a first transverse reinforcement rib of the primary structure and the bolts of the second group of bolts passing through a second transverse reinforcement rib of the primary structure, the first and second transverse reinforcement ribs directly consecutive within the primary structure of the mounting pylon.

3. The assembly as claimed in claim 2, wherein the bolts of the first group of bolts are arranged on one side of a vertical and longitudinal median plane (P1) of the assembly, and wherein the bolts of the second group of bolts are arranged on the other side of the vertical and longitudinal median plane (P1).

4. The assembly as claimed in claim 1, wherein said structural part of the pylon corresponds to an upper bracket of one of the lateral panels.

5. The assembly as claimed in claim 4, wherein the upper bracket of said lateral panel is located:
outside the pylon with respect to the lateral panel;
inside the pylon with respect to the lateral panel; or
partly inside the pylon and partly outside the pylon with respect to the lateral panel.

6. The assembly as claimed in claim 4, wherein the upper bracket corresponds to at least one non-integral part secured to the lateral panel.

7. The assembly as claimed in claim 1, wherein each fitting attached on either said front or intermediate spar of the wing box is arranged outside the wing box.

8. The assembly as claimed in claim 1, wherein each fitting attached on either said front or intermediate spar is located in the longitudinal continuity of an inner reinforcement rib of the wing box, the inner reinforcement rib attached to both the front and intermediate spar of the wing box.

9. The assembly as claimed in claim 1, wherein each fitting attached on either said front or intermediate spar has at least:
  a first plate for attachment to the front spar or the intermediate spar;
  a second attachment plate cooperating with at least one of said bolts of the row of bolts, said first and second attachment plates essentially orthogonal to each other; and
  lateral flanks secured to said first and second attachment plates.

10. The assembly as claimed in claim 1, further comprising a liner secured beneath a lower skin of the pressure face of the wing box and arranged between the lower skin and the primary structure of the pylon, with each bolt of the row of bolts passing through the liner.

11. The assembly as claimed in claim 1, wherein at least one bolt of the row of bolts is installed with a tight fit so as to be able to react the forces acting in a longitudinal direction (X) and in a transverse direction (Y) of the assembly.

12. The assembly as claimed in claim 1, wherein said fitting is attached on the front spar of the wing box.

13. The assembly as claimed in claim 12, wherein the row of bolts constitutes a front wing attachment, or wherein said front wing attachment further comprises a shear pin for reacting the forces acting in a longitudinal direction (X) and in a transverse direction (Y) of the assembly, with the shear pin intercepting the row of bolts.

14. The assembly as claimed in claim 12, wherein the row of bolts forms part of a front wing attachment, and wherein said front wing attachment further comprises two shear pins for reacting the forces acting in a longitudinal direction (X) and in a transverse direction (Y) of the assembly, with the two shear pins being spaced apart from one another in the transverse direction (Y).

15. The assembly as claimed in claim 12, further comprising a rear wing attachment arranged at a transverse reinforcement rib that closes the rear of the box-shaped primary structure, and wherein the primary structure is attached beneath the wing box solely by the front wing attachment and the rear wing attachment.

16. The assembly as claimed in claim 15, wherein the rear wing attachment comprises a shear pin projecting to the rear from the transverse reinforcement rib that closes the rear of the primary structure, the shear pin arranged essentially in a longitudinal direction (X) of the assembly.

17. The assembly as claimed in claim 16, wherein the rear wing attachment further comprises at least one shackle through which the shear pin passes.

18. The assembly as claimed in claim 15, wherein the rear wing attachment comprises a set of bolts, with each bolt passing through a structural part of the pylon, and a fitting secured to the wing.

19. The assembly as claimed in claim 18, wherein the rear wing attachment comprises a shear pin for reacting the forces acting in a longitudinal direction (X) and in a transverse direction (Y) of the assembly.

20. An aircraft comprising at least one assembly as claimed in claim 1.

\* \* \* \* \*